United States Patent [19]
Aanensen
[11] Patent Number: 4,657,086
[45] Date of Patent: Apr. 14, 1987

[54] HELICOPTER DECKS

[76] Inventor: Oscar Aanensen, N-4260 Torvastad, Norway

[21] Appl. No.: 734,468
[22] Filed: May 15, 1985
[30] Foreign Application Priority Data
Aug. 16, 1984 [NO] Norway ................ 843267
[51] Int. Cl.$^{4}$ ................ B64F 1/00
[52] U.S. Cl. ................ 169/54; 244/114 R; 244/129.2; 239/550
[58] Field of Search ................ 244/114 R, 129.2; 114/258, 85, 261; 169/54, 47, 16, 5; 239/550, 560, 561, 436, 556, 559

[56] References Cited

U.S. PATENT DOCUMENTS

| | | | |
|---|---|---|---|
| 3,348,776 | 10/1967 | Hunter | 239/561 |
| 4,181,179 | 1/1980 | Batte | 244/114 R |
| 4,202,646 | 5/1980 | Herstad | 244/114 R |
| 4,474,130 | 10/1984 | Birkeland | 244/114 R |

*Primary Examiner*—Galen Barefoot
*Assistant Examiner*—Lynn M. Fiorito
*Attorney, Agent, or Firm*—Kenyon & Kenyon

[57] ABSTRACT

A fire-extinguishing system for helicopter decks (10) comprises nozzles (24, 25) for the supply of foam or water to the helicopter deck and to a helicopter and the like placed on the helicopter deck. At the outer edge of the helicopter deck, just by a submerged gangway (13), and preferably also across the helicopter deck in or by an associated drainage duct (29), there is permanently arranged a conduit system (21, 22, 23) for foam or water, equipped with a first and a second set of nozzles. A first set of nozzles is adapted to direct a jet of foam or water of relatively low strength and relatively small range towards its respective established region of the helicopter deck in order to squirt or spray the same with foam or water. A second set of nozzles is adapted to direct a jet of foam or water of relatively high strength and relatively long range substantially in a direction towards the center of the helicopter deck.

9 Claims, 4 Drawing Figures

HELICOPTER DECKS

Figure 1:
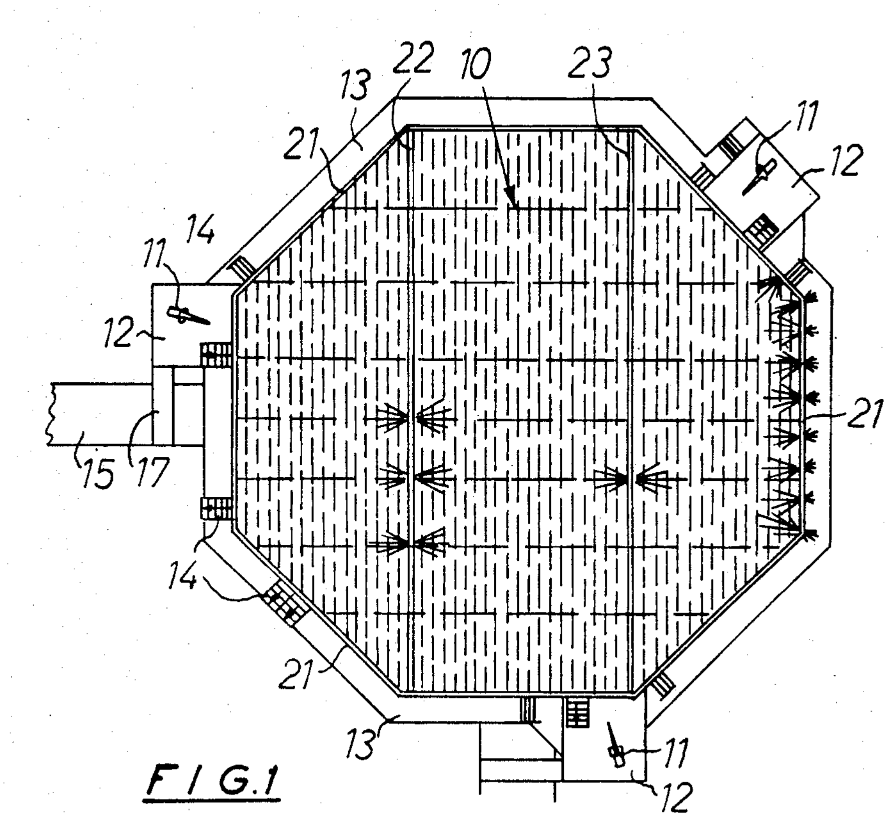

This invention relates to helicopter decks equipped with a fire-extinguishing system.

In known fire-extinguishing systems for helicopter decks, it is usual to utilise equipment such as water guns, foam-spraying arrangements and the like which are operated by personnel directly at the location of use, the fire or the beginnings of the fire being able to be attacked from various attack locations ant at different attack angles by pivoting the gun or similar equipment.

With the beginning of a fire, it is usually of decisive significance that the fire extinguishing is set in motion as rapidly as possible, the element of time being totally cohclusive for the result of the fire-extinguishing effort.

With the present invention, the objective is a solution with which the fire-extinguishing can be started by an extensive foam laying of the helicopter deck as well as a helicopter and the like which has to be arranged on the helicopter deck, independently of the conditions and without being dependent upon the presence of personnel physically at the helicopter deck at the start of the extinguishing of the fire. More particularly, the aim is to provide equipment which makes it possible to start the fire extinguishing in a rapid manner so that personnel, immediately they are ready for action with a water gun or foam-spraying arrangement or the like, can continue the extinguishing of the fire at the locations where there is a special need for this.

Accordingly, the present invention resides in a helicopter deck equipped with a fire-extinguishing system comprising: (a) gangway means extending around said deck and submerged relative to the plane of said deck; and (b) means for conveying fire-extinguishing medium comprising a conduit mounted adjacent said gangway means to surround said deck at the periphery of the latter and having first and second sets of nozzles, said first set of nozzles being adapted to direct a jet of fire-extinguishing medium of relatively low strength and relatively small range towards a predetermined region of said deck and said second set of nozzles being adapted to direct a jet of fire-extinguishing medium of relatively high strength and relatively large range in a direction towards another predetermined region substantially at the center of said deck.

With the proposed solution, there is the possibility of starting a deposition of foam, for example, by remote control or by calling forth personnel at the use location, which rapidly increases the possibility of effectively combating an outbreak of fire. One can thus spray or squirt the platform itself and a helicopter on this as well as the work area just by the platform so that water guns and foam-spraying arrangements can thereby be operated at full effect with relatively great security for the operating personnel.

Figure 2:
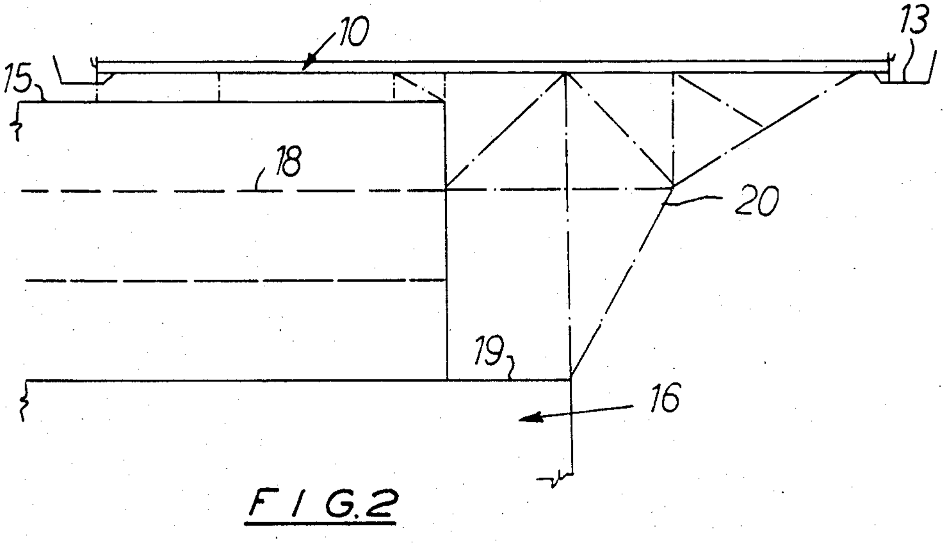
Figure 3:
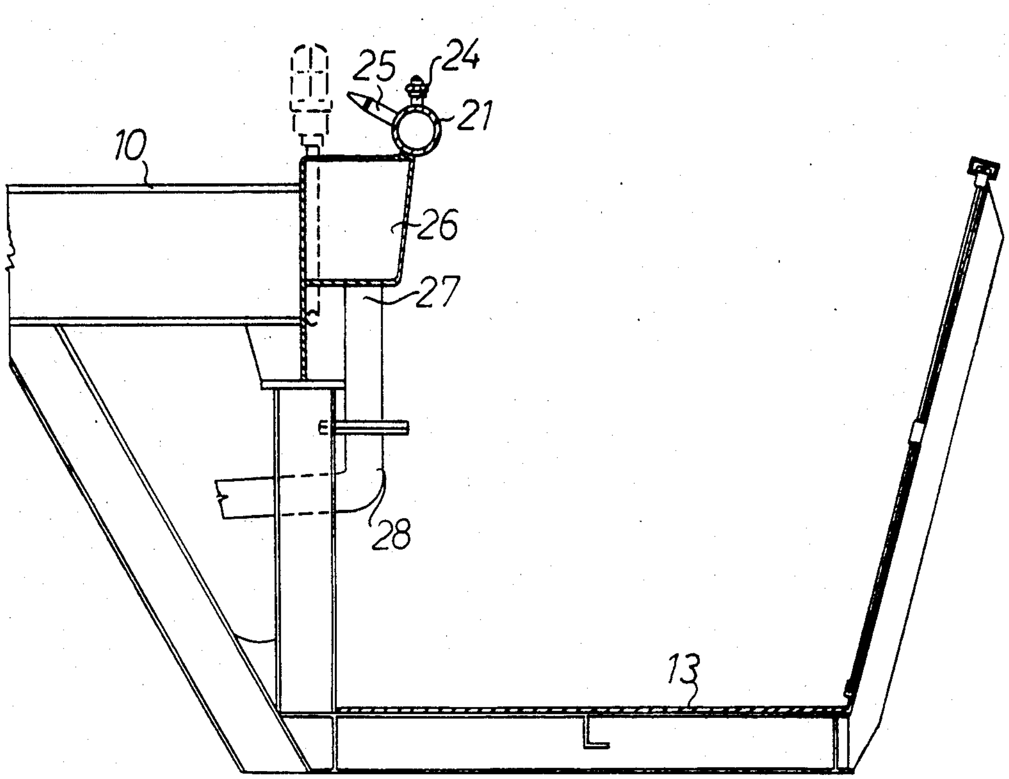
Figure 4:
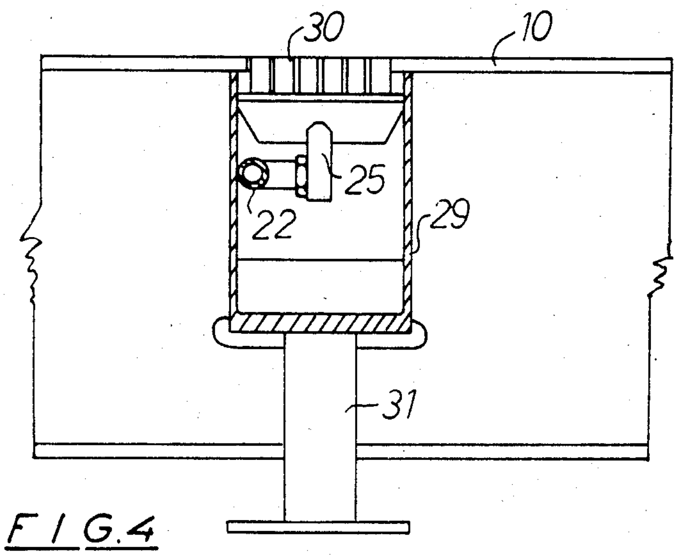

In order that the invention can be more clearly understood, convenient embodiments there will now be described, by way of example, with reference to the accompanying drawings in which:

FIG. 1 is a plan view of a helicopter deck equipped with a fire-extinguishing system, FIG. 2 is a schematic side view of the helicopter deck of FIG. 1, FIG. 3 is a vertical view, partly in section, of an outer portion of the helicopter deck, and FIG. 4 is a cut-off view showing a detail of the helicopter deck on an enlarged scale.

Referring to FIG. 1, there is shown an eight-edged helicopter deck 10. An arrangement of three fire-extinguishing guns 11 is mounted on their respective platforms 12 with suitable mutual angular intermediate spaces. Along the periphery of the helicopter deck 10 there extends a gangway 13 or escape route which (see FIGS. 2 and 3) is somewhat submerged relative to the plane of the helicopter deck. From the helicopter deck 10, there extends a series of flights of steps 14 to the platforms 12 or directly to a deck 15 on a rig 16, a ship or the like. There is also shown the gangway 17 from the platforms 12 directly to the deck 15 or adjacent access locations.

As shown in FIG. 2, the helicopter deck 10 is supported partly above the deck 15 and a deck house 18 together with a main deck 19 and partly above a support construction 20 which projects somewhat obliquely upwards and outwards from the main deck 19.

In FIG. 1, there is shown a fire-extinguishing system which comprises means in the form of a permanent arrangement of feed conduits 21, 22, 23 for supplying foam or water from a store (not shown) with associated compressed air system, pump arrangement and the like for different regions of the helicopter deck 10. There is shown a ring-shaped conduit 21 adjacent the gangway 13 which surrounds the helicopter deck at its periphery, together with two mutually parallel extending conduits 22 and 23 which extends across the helicopter deck a suitable distance from the central portion of the helicopter deck, each on its respective side of the central portion. To the conduits 21, 22, 23, there are secured series of nozzles 24 and 25 for spraying or squirting the helicopter deck with foam. The same nozzles can, in a subsequent extinguishing phase, also be used for the supply of water.

The nozzles 24 are of a first type with a relatively short range and with a relatively low strength, in order to cover a relatively local area region just by the nozzle while the nozzles 25 are adapted to direct jets with a greater range and with a greater strength towards more remotely situated regions of the helicopter deck e.g. at the center of the deck 10.

In FIG. 3, there is shown an arrangement with the conduit 21 secured to an upper outwardly directed edge of a horizontal drainage pipe 26 which is fastened along the periphery of the helicopter deck 10. From the top of the conduit 21, there project vertically upwards nozzles 24 of the first type while from a side portion of the conduit 21, nozzles 25 of the second type project obliquely upwards e.g. angularly of the deck 10 and the nozzles 24 and inwards. The nozzles 24 and 25 are arranged in set positions at established locations of the conduit so that these cover particular regions of the helicopter deck or gangway and the like separately in a predetermined manner. From the helicopter deck 10, foam and water are led, via drainage openings (not shown), to the drainage pipe 26 and further from this, via outlet 27 with associated discharge conduit 28, to a discharge tank (not shown).

In FIG. 4, there is shown a drainage duct 29 submerged in the helicopter deck 10 and covered above by a drainage grating 30, and outlet 31 extending from the bottom of the drainage duct 29 to a discharge conduit (not shown) to an associated discharge tank. In the drainage duct 29, the conduit 22 is received (the conduit 23 is arranged in an equivalent manner in a corresponding drainage duct). There is arranged a single type of nozzle fastened to the conduit 22 and this nozzle 25 is preferably of the second type having relatively great strength and having relatively long range. This applies especially to the nozzles in regions inside the periphery of the helicopter deck while the nozzles outside at the periphery of the helicopter deck can preferably be of the first type having relatively low strength and relatively small range. The nozzles in conduit 22 (or 23) can be mounted with different angular positions and, if necessary, with different ranges.

By means of the illustrated arrangement of stationarily arranged nozzles, there is the possibility of not only covering the helicopter deck with foam and spraying or squirting a helicopter on this but also of washing the helicopter on its downwardly facing sides. According to the invention, there is the possibility of first covering the whole of the helicopter deck with foam and a helicopter arranged on this and thereafter—if necessary after a certain period of time with more concentrated extinguishing work from the water guns 11 and/or another suitable fire-extinguishing equipment—there can be effected extinguishing embers, washing away of foam and the like by supplying water to the nozzles 24, 25 and the guns 11.

I claim:

1. A helicopter deck equipped with a fire-extinguishing system comprising:

(a) gangway means extending around said deck and submerged relative to the plane of said deck; and (b) means for conveying fire-extinguishing medium comprising a conduit mounted adjacent said gangway means to surround said deck at the periphery of the latter and having first and second sets of nozzles, said first set of nozzles being adapted to direct jets of fire-extinguishing medium of relatively low strength and relatively small range towards a predetermined region of said deck and said second set of nozzles being adapted to direct jets of fire-extinguishing medium of relatively high strength and relatively large range angularly of said deck and said first set of nozzles and in a direction towards another predetermined region substantially at the center of said deck.

2. The deck according to claim 1, wherein a first drainage duct is mounted at the periphery of the deck and the conduit surrounding said deck is secured to an upper, outwardly extending edge of said duct.

3. The deck according to claim 1, wherein the conveying means for fire-extinguishing medium further comprises mutually parallel conduits extending across the deck one on each side of a central portion of the latter, said mutually parallel conduits each having at least one nozzle corresponding to a nozzle of either of the first and second sets.

4. The deck according to claim 3, wherein the at least one nozzle of each mutually parallel conduit corresponds to a nozzle of the second set.

5. The deck according to claim 3, wherein each mutually parallel conduit is arranged adjacent a second discharge conduit submerged relative to the plane of the deck.

6. The deck according to claim 3, wherein each mutually parallel conduit is arranged inside a second discharge conduit submerged relative to the plane of the deck.

7. In combination, a helicopter deck for receiving a helicopter thereon; and a fire-extinguishing system including a feed conduit extending about a periphery of said deck for conveying a fire-extinguishing medium therethrough, a first set of nozzles communicating with said conduit and disposed to direct jets of fire-extinguishing medium of relatively low strength and relatively small range onto said deck and a second set of nozzles communicating with said conduit and angularly disposed relative to said deck and to said first set of nozzles to direct jets of fire-extinguishing medium of relatively high strength and relatively large range in a direction onto a helicopter at a center of said deck.

8. The combination as set forth in claim 7 wherein said fire-extinguishing system further includes a pair of parallel conduits communicating with said peripherally disposed feed conduit and extending across said deck to convey the fire-extinguishing medium therethrough, a first series of nozzles in each said conduit of said pair of conduits to direct jets of fire-extinguishing medium onto localised regions of said deck and a second series of nozzles in each conduit of said pair of conduits to direct jets of fire-extinguishing medium onto downwardly facing sides of a helicopter on said deck.

9. The combination as set forth in claim 8 which further comprises a drainage duct at said periphery of said deck and a gangway extending around said periphery of said deck in a plane below said deck.

* * * * *